(12) United States Patent
Regier

(10) Patent No.: US 10,051,790 B2
(45) Date of Patent: Aug. 21, 2018

(54) VANE ARRANGEMENT IN COMBINE HARVESTER PROCESSOR

(71) Applicant: AGCO Corporation, Hesston, KS (US)

(72) Inventor: Bernard Dean Regier, Newton, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/031,639

(22) PCT Filed: Nov. 6, 2014

(86) PCT No.: PCT/IB2014/002350
§ 371 (c)(1),
(2) Date: Apr. 22, 2016

(87) PCT Pub. No.: WO2015/075516
PCT Pub. Date: May 28, 2015

(65) Prior Publication Data
US 2016/0262309 A1      Sep. 15, 2016

Related U.S. Application Data

(60) Provisional application No. 61/908,217, filed on Nov. 25, 2013.

(51) Int. Cl.
| | |
|---|---|
| *A01F 7/06* | (2006.01) |
| *A01F 12/24* | (2006.01) |
| *A01F 12/26* | (2006.01) |
| *A01F 12/22* | (2006.01) |
| *A01F 12/44* | (2006.01) |

(52) U.S. Cl.
CPC ............. *A01F 7/06* (2013.01); *A01F 12/22* (2013.01); *A01F 12/24* (2013.01); *A01F 12/26* (2013.01); *A01F 12/444* (2013.01); *A01F 12/446* (2013.01)

(58) Field of Classification Search
CPC .. A01F 7/06; A01F 12/22; A01F 12/24; A01F 12/26; A01F 12/444; A01F 12/446
See application file for complete search history.

(56) References Cited

U.S. PATENT DOCUMENTS 1,744,334 A *  1/1930  Schlayer .................. A01F 7/06
                                                            460/66
3,982,548 A     9/1976  Stamp et al.
(Continued)

FOREIGN PATENT DOCUMENTS

| EP | 1894465 A1 | 3/2008 |
|---|---|---|
| EP | 2614702 A1 | 7/2013 |

OTHER PUBLICATIONS

UK Intellectuall Property Office, International Search Report for related UK Application No. GB1403685.9, dated Aug. 29, 2014.
(Continued)

*Primary Examiner* — Thomas B Will
*Assistant Examiner* — Joan D Misa

(57) ABSTRACT

A combine harvester processing system comprises a rotor and a rotor cage encircling the rotor. The rotor cage comprises an arcuate section having an interior surface which includes a first vane and a second vane each disposed at an angle relative to a radial axis. The first vane is disposed forwardly of the second vane. The angle of the first vane is less than the angle of the second vane.

4 Claims, 7 Drawing Sheets

(56) References Cited

U.S. PATENT DOCUMENTS

| | | | | |
|---|---|---|---|---|
| 4,244,380 | A * | 1/1981 | DePauw | A01F 7/067 460/108 |
| 4,249,542 | A * | 2/1981 | Schuler | A01F 7/06 460/67 |
| 4,250,896 | A | 2/1981 | Wagstaff et al. | |
| 4,258,726 | A * | 3/1981 | Glaser | A01F 12/24 460/109 |
| RE31,257 | E * | 5/1983 | Glaser | A01F 12/24 460/80 |
| 4,497,327 | A | 2/1985 | Hug et al. | |
| 4,541,441 | A * | 9/1985 | Ichikawa | A01F 7/06 460/66 |
| 4,900,290 | A | 2/1990 | Tanis | |
| 5,112,279 | A * | 5/1992 | Jensen | A01F 12/442 460/69 |
| 5,152,717 | A * | 10/1992 | Nelson | A01F 12/442 460/110 |
| 5,334,093 | A | 8/1994 | Jensen et al. | |
| 5,342,239 | A * | 8/1994 | West | A01F 12/22 460/110 |
| 7,473,170 | B2 * | 1/2009 | McKee | A01F 7/067 460/109 |
| 7,682,236 | B2 * | 3/2010 | Buermann | A01F 7/067 460/109 |
| 7,717,777 | B2 * | 5/2010 | Pope | A01F 7/067 460/69 |
| 8,221,202 | B2 * | 7/2012 | Pope | A01F 7/06 460/68 |
| 8,540,559 | B1 * | 9/2013 | Flickinger | A01F 7/067 460/69 |
| 8,926,415 | B2 * | 1/2015 | Farley | A01F 7/067 460/107 |
| 2005/0026663 | A1 | 2/2005 | Grywacheski et al. | |
| 2009/0111547 | A1 | 4/2009 | Pope et al. | |
| 2009/0143123 | A1 | 6/2009 | Pope et al. | |
| 2011/0320087 | A1 * | 12/2011 | Farley | A01F 7/067 701/34.2 |
| 2013/0137492 | A1 | 5/2013 | Biggerstaff et al. | |
| 2015/0141097 | A1 * | 5/2015 | Regier | A01F 12/28 460/80 |
| 2016/0000009 | A1 * | 1/2016 | Duquesne | A01F 7/067 460/66 |

OTHER PUBLICATIONS

European Patent Office, International Search Report for International Patent Application No. PCT/IB2014/002350, dated Mar. 30, 2015.

\* cited by examiner

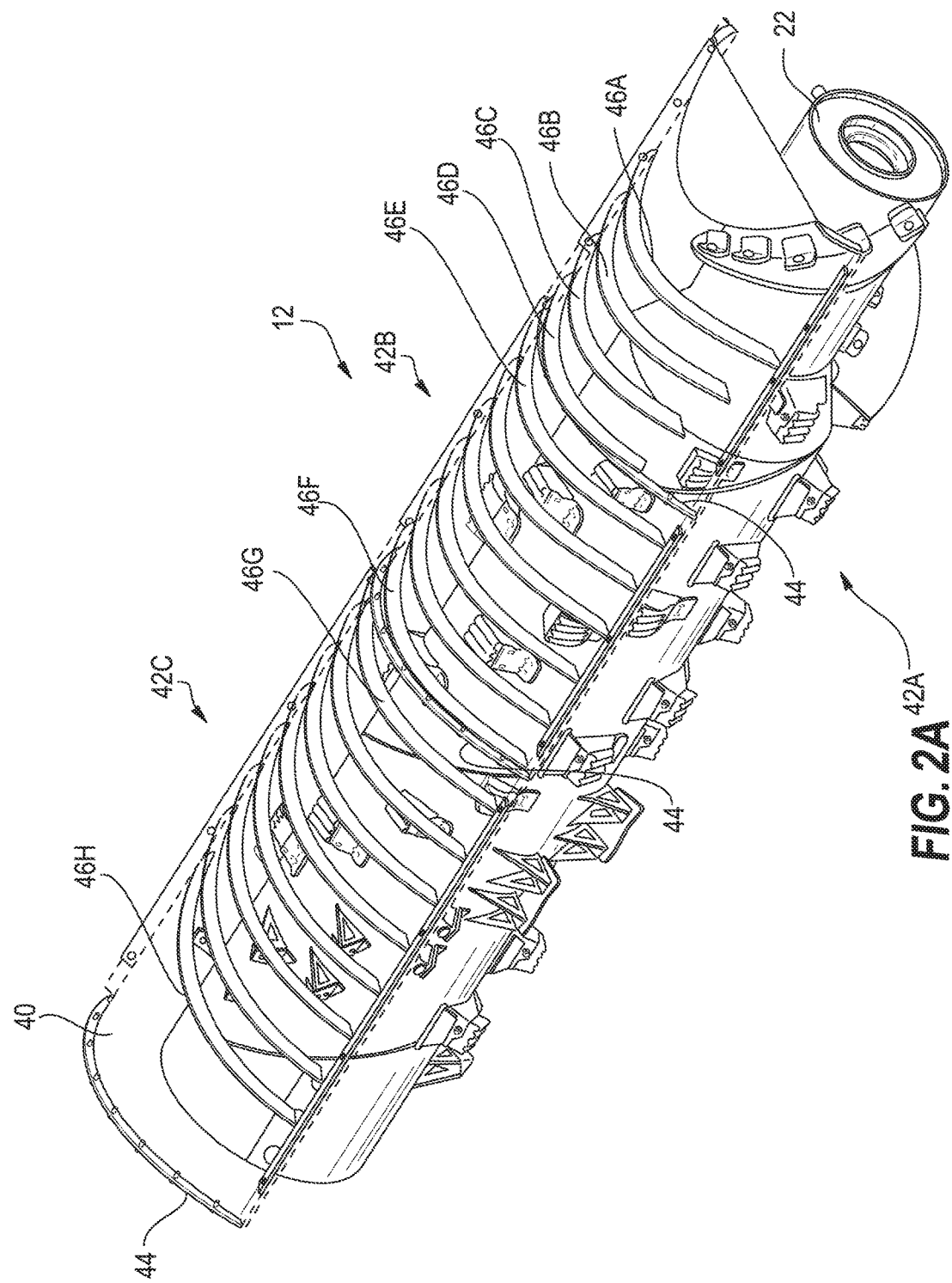

VANE ARRANGEMENT IN COMBINE HARVESTER PROCESSOR

TECHNICAL FIELD

The present disclosure is generally related to agricultural systems and, more particularly, combine harvester processing systems.

BACKGROUND

A combine harvester is provided with many systems that provide a multitude of functionality, including threshing, separating, and cleaning of crop material (e.g., grain and material other than grain (MOG)). The threshing and separating is performed by a processing system. In one type of processing system, the crop material travels axially parallel to, and helically around, the rotational axis of one or more rotary processing devices commonly referred to as rotors. In other systems, during at least a portion of its travel through the system, the crop material travels in a transverse or tangential direction relative to the rotational axis of a rotary processing device commonly referred to as a threshing cylinder. In each case, the crop material is processed between elements affixed to the periphery of the rotary device and arcuate, usually foraminous, stationary processing members in the form of threshing concaves and/or separating grates that partially wrap around the lower portion of the device.

SUMMARY OF INVENTION

According to the invention there is provided a combine harvester processing system as set forth in Claim 1.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2A is a schematic diagram that illustrates, in front isometric, partially transparent fragmentary view, select features of an example embodiment of a combine processing system.

DESCRIPTION OF EXAMPLE EMBODIMENTS

Overview

Figure 1:
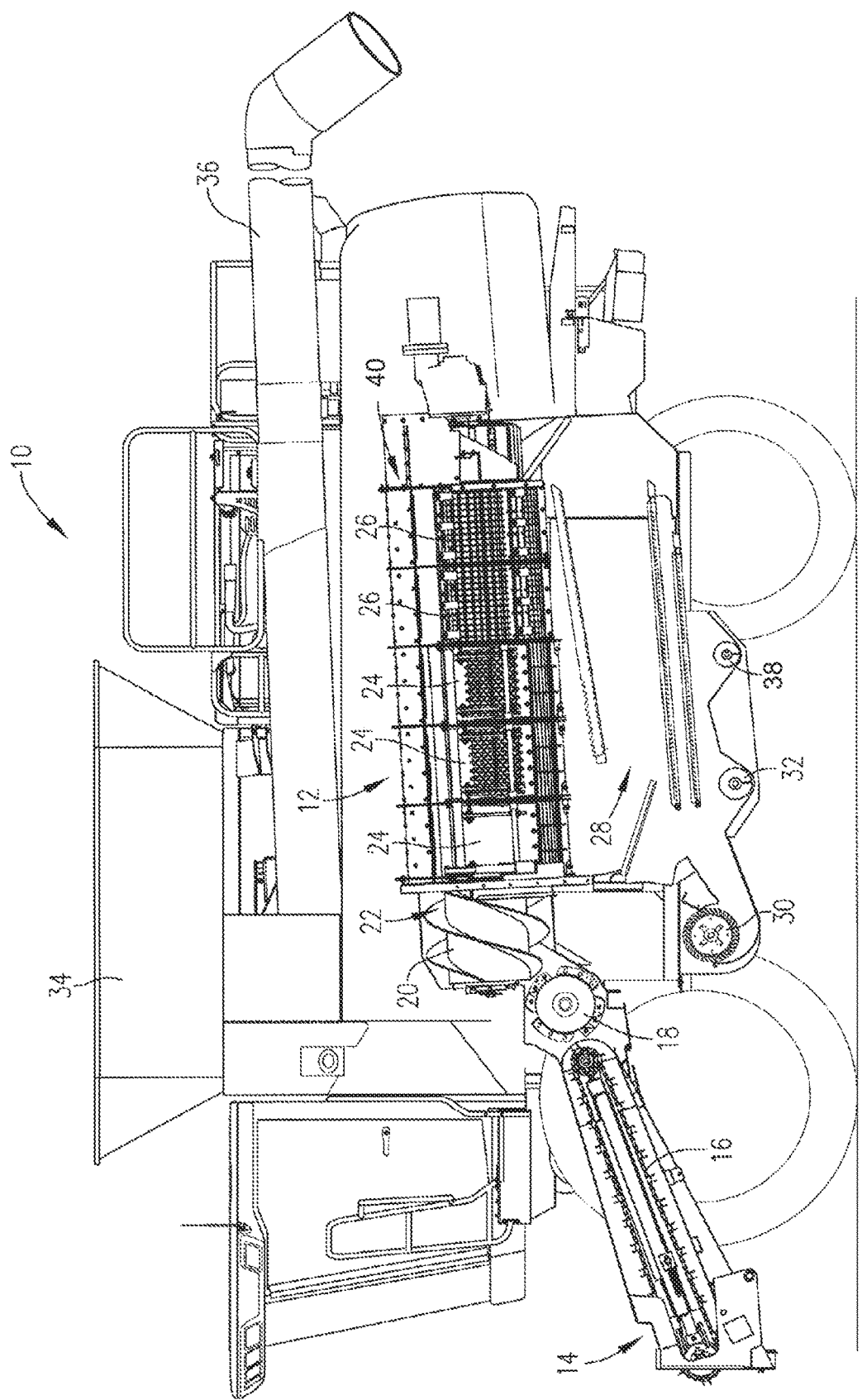
FIG. 1 is a schematic diagram that illustrates, in side elevation, partially cut-away fragmentary view, an example environment in which an embodiment of a combine processing system may be implemented.

In one embodiment, a combine processing method, comprising causing a mat of crop material to progress at least in part along a rotating rotor encircled by a rotor cage, the crop material comprising a mixture of grain and material other than grain (MOG); and causing a thinning of the mat by engaging the crop material with a plurality of vanes affixed to an interior surface of a detachable arcuate section of the rotor cage, wherein a first vane adjacent to a crop material flow ingress end of the arcuate section has a different angle, relative to a radial axis, than an angle of a second vane adjacent to a crop material flow egress end of the arcuate section, the plurality of vanes comprising the first and second vanes.

DETAILED DESCRIPTION

Certain embodiments of a combine processing system and method are disclosed that involve the separation of grain from material other than grain (MOG) (the grain and MOG collectively referred to herein as crop material), and in particular, the thinning of the crop material as it moves through a processing system of a combine harvester (hereinafter, the combine harvester simply referred to as a combine). In one embodiment, a combine processing system comprises a rotor cage with top cover vanes disposed on the interior surface of the rotor cage. The vanes are arranged such that a continuous vane angle increase from the beginning of the processing system to the end of the processing system is realized.

Digressing briefly, it has been observed that the separation of grain from MOG in a processing system is easier when the crop mat is thin. The crop mat comprises the crop material (e.g., the mixture of grain and MOG) as it moves through the processing system. Some conventional systems that utilize vanes arrange the vanes in a fixed angle pattern within a given arcuate section, and may maintain that fixed angle configuration along the length of the rotor cage or in some systems, abruptly adjust the angle between vanes in one section versus another. Such an angle change is not implemented in a gradual manner, which may cause inefficiencies in processing operation and a corresponding reduced grain yield. In certain embodiments of combine processing systems, the gradual increase in vane angles in accordance with the crop material flow facilitates stretching of the mat of crop material, causing a thinning of the crop mat, which may improve performance over conventional systems.

Having summarized certain features of one or more combine processing systems of the present disclosure, reference will now be made in detail to the description of the disclosure as illustrated in the drawings. While the disclosure will be described in connection with these drawings, there is no intent to limit it to the embodiment or embodiments disclosed herein. For instance, though axial-based rotor designs are described herein for illustrative purposes, it should be appreciated within the context of the present disclosure that certain embodiments of combine processing systems may be used in transverse rotor, twin-rotor, hybrid, conventional, and/or other combine core designs. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Note that references hereinafter made to certain directions, such as, for example, "front", "rear", "left" and "right", are made as viewed from the rear of the combine looking forwardly.

Reference is made to FIG. 1, which illustrates an example environment, that is, a combine 10, in which an embodiment of a combine processing system may be implemented. One having ordinary skill in the art should appreciate in the context of the present disclosure that the example combine 10 depicted in FIG. 1 is merely illustrative, and that other combine designs may be used in some embodiments. For instance, the combine 10 selected for illustration in FIG. 1 has a single axial flow processing system 12 that extends generally parallel with the path of travel of the machine. However, as explained above, some embodiments of a processing system 12 may use non-axial flow designs and/or use more than a single rotor. As well understood by those skilled in the art, in the illustrated embodiment, the combine harvester 10 includes a harvesting header (not shown) at the front of the machine that delivers collected crop materials to the front end of a feeder house 14. Such materials are moved upwardly and rearwardly within the feeder house 14 by a conveyor 16 until reaching a beater 18 that rotates about a transverse axis. The beater 18 feeds the material upwardly and rearwardly to a rotary processing device, in this instance to a rotor 22 having an infeed auger 20 on the front end thereof. The auger 20, in turn, advances the materials axially into the processing system 12 for threshing and separating. In other types of systems, the conveyor 16 may deliver the crop material directly to a threshing cylinder.

Generally speaking, the crop materials entering the processing system 12 move axially and helically therethrough during threshing and separating operations. During such travel the crop materials are threshed and separated by the rotor 22 operating in cooperation with foraminous, arcuate processing members in the form of threshing concave assemblies 24 and separator grate assemblies 26, with the grain escaping laterally through the concave assemblies 24 and the grate assemblies 26 into a cleaning mechanism 28. Bulkier stalk and leaf materials are retained by the concave assemblies 24 and the grate assemblies 26 and are impelled out the rear of the processing system 12 and ultimately out of the rear of the machine. A blower 30 forms part of the cleaning mechanism 28 and provides a stream of air throughout the cleaning region below the processing system 12 and is directed out the rear of the machine so as to carry lighter chaff particles away from the grain as it migrates downwardly toward the bottom of the machine to a clean grain auger 32. The auger 32 delivers the clean grain to an elevator (not shown) that elevates the grain to a storage bin 34 on top of the machine, from which it is ultimately unloaded via an unloading spout 36 (shown in the stowed position). A returns auger 38 at the bottom of the cleaning region is operable in cooperation with other mechanisms (not shown) to reintroduce partially threshed crop materials into the front of the processing system 12 for an additional pass through the system.

Note that reference hereinafter to a rotor cage, denoted by reference numeral 40 in FIG. 1, refers to the top cover (e.g., including one or more arcuate sections) and the concave assemblies 24, the grate assemblies 26, or any combination of all of these components, the scope of which is determinable from the context in which the terms, rotor cage, are used.

Having described some general features of an embodiment of a processing system 12, attention is directed to FIG. 2A, which illustrates in front isometric, partially transparent fragmentary view, select features of an example embodiment of a processing system 12. In particular, shown in FIG. 2A is the top covers only of the rotor cage 40 (the concave assemblies 24 and the grate assemblies 26 of FIG. 1 omitted to facilitate an understanding of the processing system 12), with three (3) detachable top cover, arcuate sections 42A (forward), 42B (middle), and 42C (rearward). For instance, each adjacent section 42 is detachably coupled to one another at the respective ribs 44 (the ribs located at mutually axially spaced locations along the rotor cage 40), such as via bolts, screws, or other known detachable affixing mechanisms. In some embodiments, each section 42 may be welded together, effectively resulting in a single top section comprising the rotor cage 40. Each top cover section 42 comprises an interior surface, the interior surface comprising plural vanes 46. The plural vanes 46 extend from the interior surface (e.g., affixed to and abutted all or in part against the surface) and partially into the space located between the rotor 22 and the top covers of the rotor cage 40. In one embodiment, the plural vanes 46 are limited to the interior surface of the top cover sections 42 of the rotor cage 40. In some embodiments, the vanes 46 may be located in both the top covers and at least partially the bottom concave and grate assembly sections (i.e., the interior surfaces) of the rotor cage 40. Further, although the top cover sections 42 are shown to extend along three (3) sections, which corresponds in FIG. 1 to the lower concave assemblies 24, some embodiments of the processing system 12 may extend the sections 42 over the grate assemblies 26 in addition to over the concave assemblies 24.

Referring to the forward section 42A, the interior surface comprises in this example plural (e.g., five (5) vanes, with four (4) of them referenced as vanes 46A, 46B, 46C, and 46D, though discussion for the non-referenced vane similarly applies). In some embodiments, fewer or more quantities of vanes 46 may be used in this section 42A or other sections 42B and 42C. The angles of the vanes 46A-42D gradually change. For instance, in some embodiments, the angle change within any or all given sections 42 may occur in every vane 46. In some embodiments, the angle change within any or al given sections 42 may occur in every other vane 46, or in some embodiments, every defined quantity (e.g., greater than every second vane 46) of vanes 46.

Figure 2B:
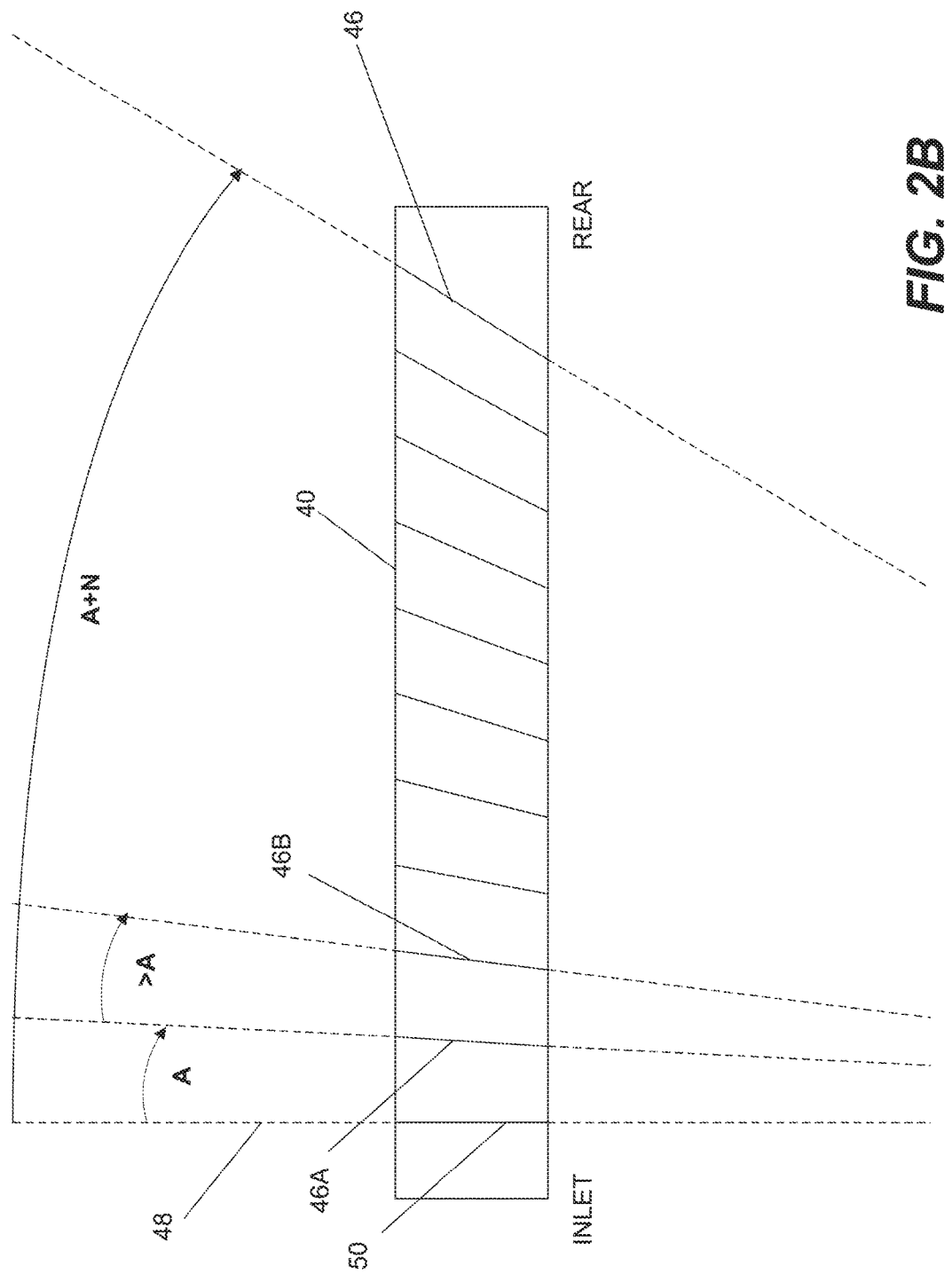
FIG. 2B is a block diagram that illustrates, in top plan fragmentary view, a gradual change in vane angles over plural vanes of a top cover of a rotor cage in an embodiment of a combine processing system.

Referring to FIG. 2B, shown is a block diagram that illustrates in top plan, fragmentary view, an example of a gradual change in vane angles over a defined length of the rotor cage 40, and in this example, from front (e.g., the inlet, to the left of FIG. 2B) to back (e.g., to the right in FIG. 2B). Discussion of the individual, plural sections 42, and the illustration of the same in FIG. 2B, are omitted here for brevity, with emphasis on the gradual change in vane angles. A radial axis plane 48 extending from a radial axis 50 of the rotor cage 40, the radial axis 50 (and radial axis plane 48) having an angle of zero (0) degrees is shown, and serves as a reference to any departure in vane angle throughout the length of the rotor cage 40. For instance, the first vane 46A may have an angle of A degrees (where A can be an angle greater than or approximately equal to zero), the second vane 46B may have an angle greater than A degrees, and so on according to a gradual change (e.g., gradual increase), until the last vane 46 adjacent the rear end is at A+N degrees, where N is a positive number greater than any of the preceding (more forward) vanes 46. In one embodiment, the range of vane angles is from zero (0) degrees to twenty (20) degrees going from inlet to the rear of the rotor cage 40. Note that the angle values are merely used for illustration, and that other degree changes and/or maximum angles may be used in some embodiments. In the depicted example, each vane 46 has a different angle compared to all adjacent vanes 46. In some embodiments, the change may occur in different vane or rotor cage length increments, as described above.

Returning to FIG. 2A, the gradual change is continual over the length of the three sections 42A-42C. For instance, the angle of the vane 46E at the front of the second section 42B is less than the angle of the next vane 46 rearwardly adjacent the vane 46E, which is less than the angle of the last vane 46F of that section 42B (the rearward-most vane 46F of the section 42B) and any intervening vanes 46 of that section 42B. Similarly, in the section 42C, there is a gradual increase in vane angles, such that the angle of the vane 46G (at the front of the section 42C) is less than the angle of the vane 46H (at the rear of the section 42C) and of the intervening vanes 46 of that section 42C.

As explained above, though the sections 42A-42C of the rotor cage 40 in FIG. 2B correspond in length to the underlying concave assemblies 24 (FIG. 1), it should be appreciated that in some embodiments, the top cover sections 42, with the continued gradual change in vane angles, may extend to vanes 46 located over the concave assemblies 24 and the grate assemblies 26 (FIG. 1). Further, the quantity of vanes 46, including the quantity of vanes 46 per section 42, and the number of sections 42, is merely illustrative, and it should be appreciated by one having ordinary skill in the art in the context of the present disclosure that other quantities of vanes 46, sections 42, and/or vanes 46 per section 42 may be used and hence are contemplated to be within the scope of the disclosure.

Figure 3:
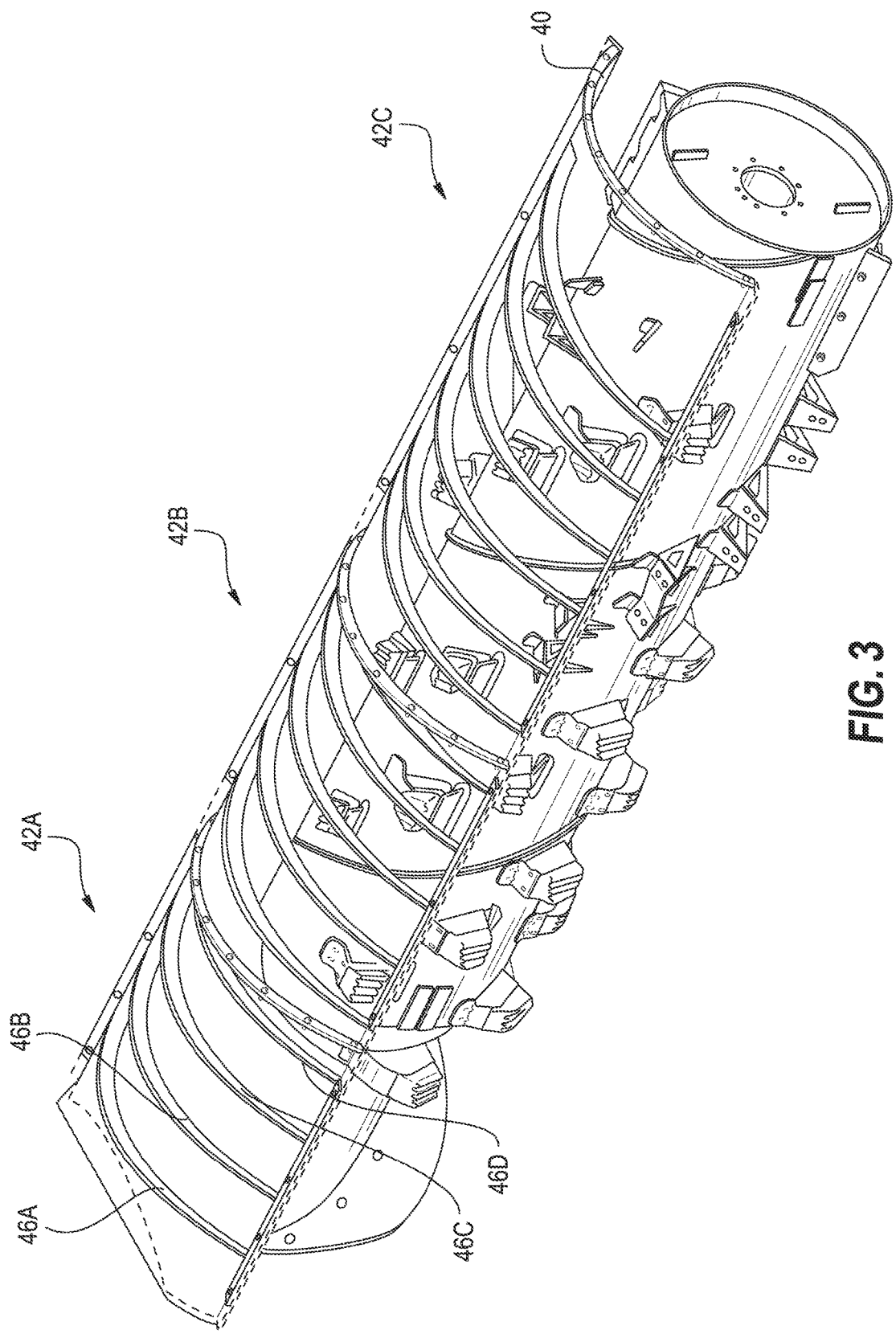
FIG. 3 is a schematic diagram that illustrates, in rear isometric, partially transparent fragmentary view, select features of an example embodiment of a combine processing system.

FIG. 3 is a rear isometric, partially transparent fragmentary view of the rotor cage 40 shown in FIG. 2B. Similar to the description above, shown are three (3) arcuate sections 42A, 42B, and 42C, which may be of the same or unequal length, with only the top cover of the rotor cage 40 depicted. In one embodiment, each section 42 comprises plural vanes 46 (e.g., referenced vanes 46A-46D in the front section 42A shown as a representative example), where there is a gradual increase in each vane angle relative to the radial axis within each section 42 and throughout the length of the rotor cage 40 where the vanes 46 reside on the interior side.

Figure 4:
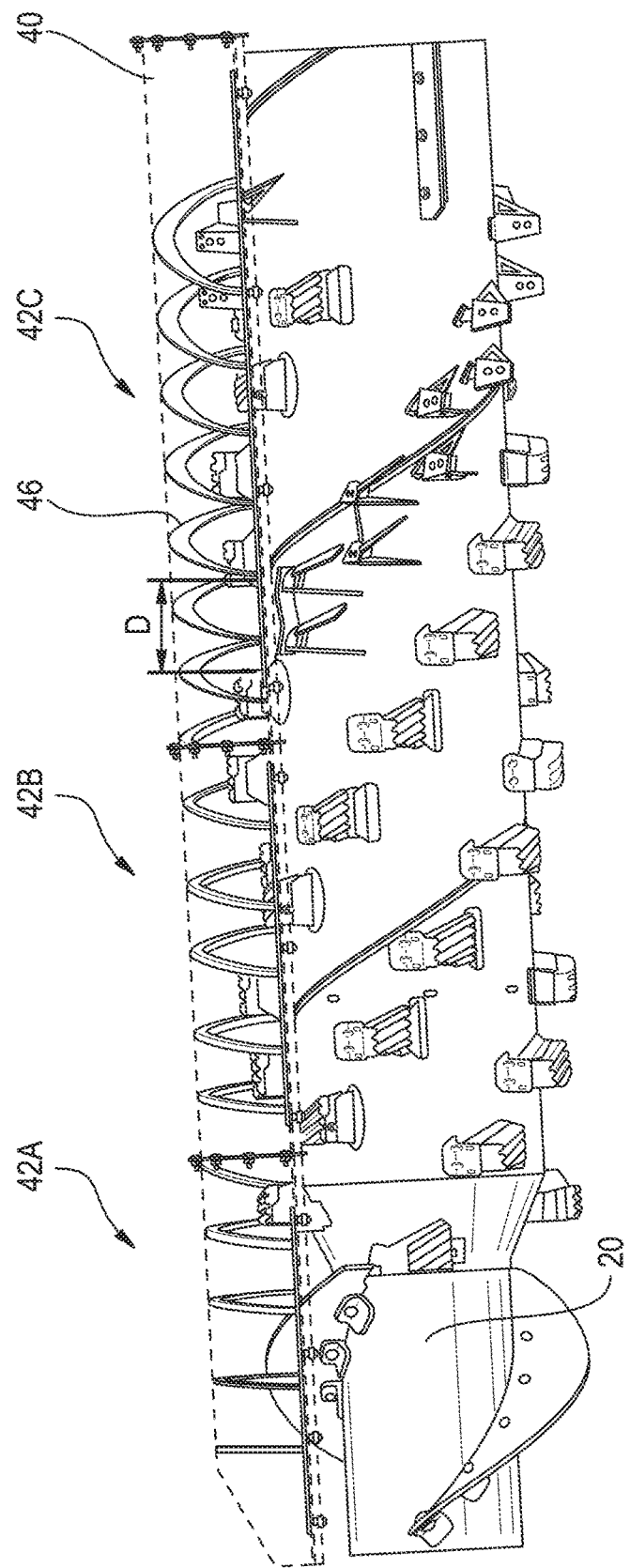
FIG. 4 is a schematic diagram that illustrates, in a side elevation, partially transparent fragmentary view, select features of an example embodiment of a combine processing system.

FIG. 4 is a side elevation, partially transparent fragmentary view of the rotor cage 40 shown in FIGS. 2B and 3, with only the top cover sections 42A, 42B, and 42C of the rotor cage 40 depicted. Note that the forward arcuate section 42A is disposed proximal to and above the infeed auger 20, and that in one embodiment, the distance, D, between adjacent vanes 46 is uniform (e.g., as measured from the base of the interior surface), though some embodiments may deploy non-uniform spacing between adjacent vanes 46 in one or more top cover sections 42.

Figure 5:
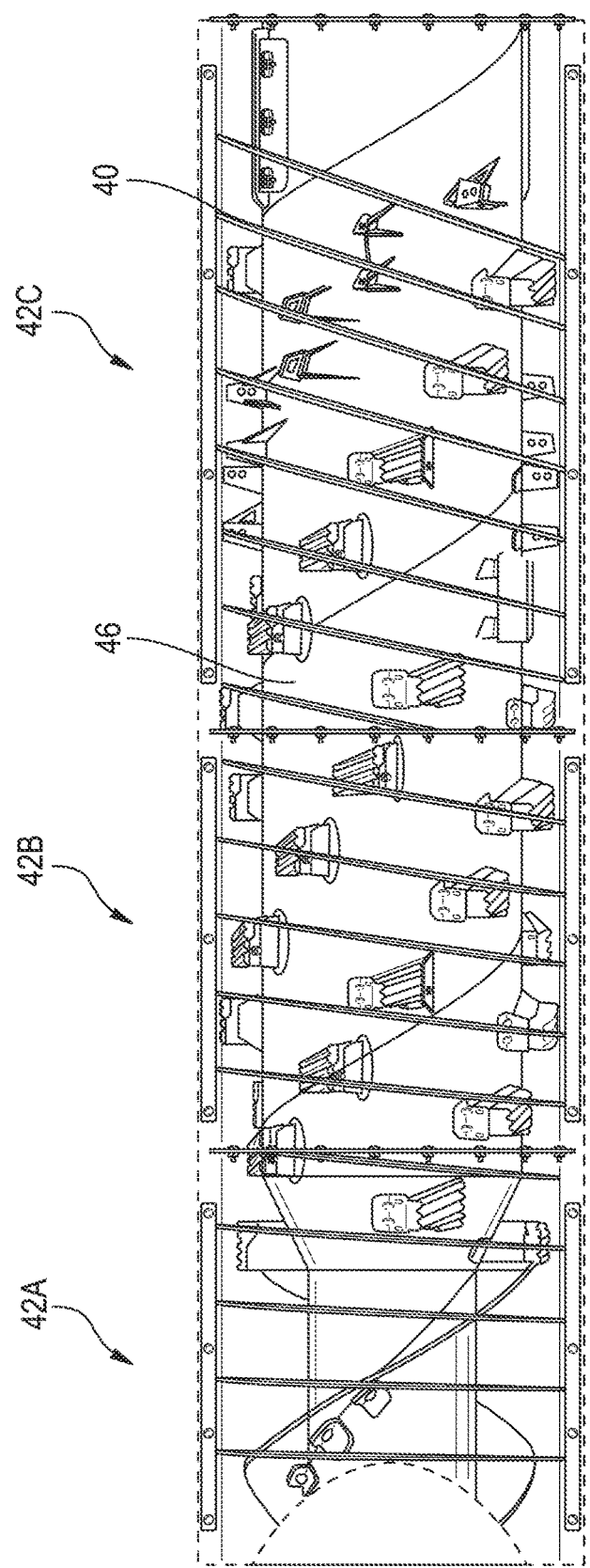
FIG. 5 is a schematic diagram that illustrates, in a top plan, partially transparent view, select features of an example embodiment of a combine processing system.
Figure 6:
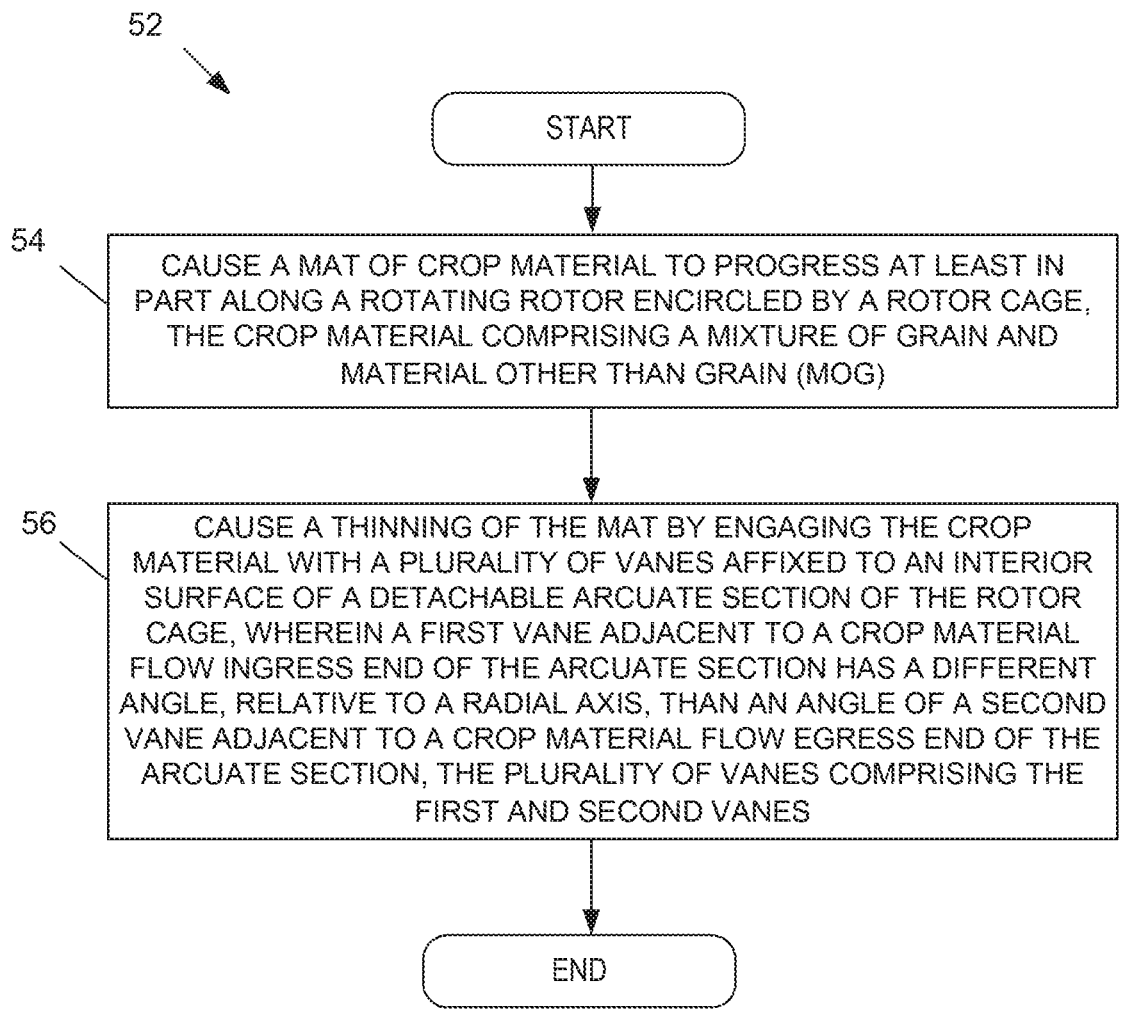
FIG. 6 is a flow diagram that illustrates an example embodiment of a combine processing method.

FIG. 5 is a top plan, partially transparent view of the top cover sections 42A, 42B, and 42C of the rotor cage 40 with respective plural vanes 46 on the interior surfaces of the top covers, further illustrating the gradual change in vane angles, relative to the radial axis, from front (e.g., to the left in FIG. 5) to the rear (e.g., to the right in FIG. 5) of the rotor cage 40, as well as within each section 42A, 42B, and 42C.

It should be emphasized that the above-described embodiments of the present disclosure are merely possible examples of implementations, merely set forth for a clear understanding of the principles of the disclosure.

The invention claimed is:

1. A combine harvester processing system configured to move through a field to be harvested in a forward direction, the combine harvester processing system comprising:
   a rotor, said rotor having a radial axis perpendicular to the forward direction;
   a rotor cage encircling the rotor, the rotor cage comprising an arcuate section having an interior surface, wherein the interior surface of the arcuate section comprises a plurality of vanes, with each vane of said plurality of vanes is disposed at an angle relative to a radial axis plane which extends from the radial axis of the rotor cage, and wherein each vane of said plurality of vanes has a different angle, relative to the radial axis, compared to an angle of each of the other vanes of said plurality of vanes, wherein the angle of each vane of said plurality of vanes increases from front to back.

2. The system of claim 1, wherein the plurality of vanes correspond to top cover sections that are associated, at least in part, with a lower concave portion of the rotor cage.

3. The system of claim 1, wherein the plurality of vanes correspond to top cover sections that are associated, at least in part, with a lower separator portion of the rotor cage.

4. The system of claim 1, wherein the interior section comprising the plurality of vanes is limited to a detachable top cover section of the rotor cage.

* * * * *